United States Patent

Sands

[15] 3,683,957

[45] Aug. 15, 1972

[54] SAFETY VALVE

[72] Inventor: Asa D. Sands, 3606 Federal St., Camden, N.J. 08105

[22] Filed: Sept. 29, 1970

[21] Appl. No.: 76,462

Related U.S. Application Data

[63] Continuation-in-part of Ser. No. 771,595, Oct. 29, 1968, Pat. No. 3,561,471, which is a continuation-in-part of Ser. No. 637,714, May 11, 1967, abandoned.

[52] U.S. Cl. ............137/460, 137/462, 137/498, 251/286, 251/208
[51] Int. Cl. ......................................F16k 17/24
[58] Field of Search......137/460, 461, 467, 498, 517; 251/284, 285, 286, 122, 208; 151/33, 69

[56] References Cited

UNITED STATES PATENTS

| | | | |
|---|---|---|---|
| 3,419,247 | 12/1968 | Bosi | 251/122 |
| 3,085,589 | 4/1963 | Sands | 137/498 |
| 2,346,224 | 4/1944 | Lyon | 137/462 |
| 3,321,195 | 5/1967 | Korte | 251/285 X |
| 3,323,546 | 6/1967 | Lord | 251/284 X |
| 2,922,432 | 1/1960 | Huntington | 137/454.2 X |
| 2,623,725 | 12/1952 | Sands | 137/513.3 X |
| 2,450,446 | 10/1948 | Rupp | 137/513.3 X |
| 3,106,937 | 10/1963 | Sands | 137/462 X |
| 2,121,936 | 6/1938 | Thomas | 137/498 |
| 3,051,196 | 8/1962 | Miller | 137/543.23 X |
| 2,935,292 | 5/1960 | Williamson | 251/285 |

*Primary Examiner*—Harold W. Weakley
*Attorney*—Munson H. Lane

[57] ABSTRACT

A valve body defining a chamber with coaxial valve ports and valve seats on the ports facing the chamber. A valve member is movable axially in the chamber into engagement with either of the seats. The valve member is supported in the chamber, normally centrally between the seats, by a pair of coil springs which are seated in the valve ports and on opposite sides of the valve member. In some embodiments additional support of the valve member is provided by a rod extending axially through the valve member and having its end portions slidably journalled in bearing means provided in the valve ports. A fluid by-pass from one port to the other is provided, either in the valve body or axially through the valve member.

2 Claims, 25 Drawing Figures

Patented Aug. 15, 1972  3,683,957

INVENTOR
Asa D. Sands

BY *Munson H. Lane*

ATTORNEY

INVENTOR

Asa D. Sands

BY Munson H. Lane

ATTORNEY

Patented Aug. 15, 1972 3,683,957

INVENTOR

Asa D. Sands

BY *Munson H. Lane*

ATTORNEY

INVENTOR
ASA D SANDS

BY Munson H Kane
ATTORNEY

INVENTOR
ASA D. SANDS
BY Munson H. Lane
ATTORNEY

SAFETY VALVE

This application is a continuation-in-part of my copending application Ser. No. 771,595 filed Oct. 29, 1968 now U.S. Pat. No. 3,561,471, granted Oct. 20, 1970, which in turn is a continuation-in-part of my copending application Ser. No. 637,714, filed May 11, 1967, now abandoned.

This invention is an improvement over the inventions covered in my U.S. Pats. Nos. 2,623,725, granted Dec. 30, 1952; 3,085,589, granted Apr. 16, 1963; 3,106,937, granted Oct. 15, 1963; and 3,122,162, granted Feb. 25, 1964.

This invention relates to an improved safety valve for fluid conduits incident to operation of fluid actuated tools, distribution of gas for welding, distribution of gas for heating and chemical uses and the like, which will prevent injury to personnel, damage to equipment and loss of fluids in case of accident.

A purpose of the invention is to provide a safety valve which is substantially free of valve flutter resulting from an unequal distribution of fluid flow around the valve member.

It is an object of the invention to provide a stream lined valve member which is centrally located in a valve chamber and which will cause fluid to divide and flow equally around the circumference of the valve member.

It is another object of the invention to provide a safety valve which is spring supported and spring biased to an intermediate position within a valve chamber between opposed valve seats and which is caused to move axially relative to one of the valve seats as a result of an even distribution of fluid flow around the circumference of the valve member when a pressure differential across the valve occurs.

Another object of the invention is to provide a safety valve of the aforementioned type which is equipped with be-pass means operable to effect a substantial balance of fluid pressure across the valve and restore the valve to its normal position when conditions creating a pressure differential across the valve have been rectified. Such by-pass means are manually controlled, and an important feature thereof is the provision of means for preventing an accidental discharge of fluid from the valve when the by-pass means are manually adjusted.

These and other objects, advantages and novel features will be apparent from the following description and the accompanying drawings.

Figure 1:
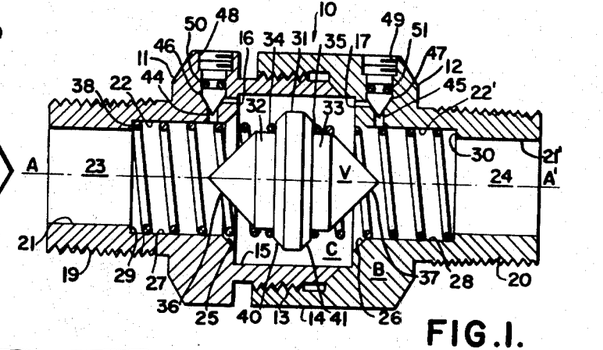
FIG. 1 is an axial sectional view of the valve of the invention.

In FIG. 1 I have illustrated one form of my safety valve assembly which is particularly useful in fluid conduits transporting gas where the leakage of the gas would be costly because of its economic value, or dangerous because of its hazardous characteristics to life and to property. The safety valve assembly 10 includes a valve body generally indicated by the letter B which body consists of male and female members 11 and 12 connected together by a threaded joint 13. The valve body B when members 11 and 12 are joined includes a hollow intermediate portion 14 having a cylindrical inner surface 5 and circular opposed inner end walls 16 and 17 encompassing a valve chamber C, and hollow end portions 19 and 20 on opposite sides of said intermediate portion 14. The hollow end portions 19 and 20 have corresponding first cylindrical inner surfaces 21,21' and second cylindrical inner surfaces 22,22' encompassing valve passages or ports 23 and 24. The valve chamber C and the valve passages 23 and 24 have a common axis A-A' and the diameter of the valve chamber C is greater than the diameter of the valve passages 23 and 24. A pair of opposed conical valve seats 25 and 26 are formed in the valve body B at opposite ends of the valve chamber C between the end walls 16 and 17 respectively, and the second cylindrical inner surfaces 22 and 22' respectively. The second cylindrical inner surfaces 22 and 22' are of greater diameter than the first cylindrical surfaces 21,21' thereby forming opposite annular recesses 27 and 28 respectively opening into the valve chamber C. The ends of the recesses 27 and 28 form annular shoulders 29 and 30 separating the first cylindrical inner surfaces 21,21' from the second cylindrical inner surfaces 22,22' respectively.

It will be apparent that the valve passages 23 and 24, the valve seats 25 and 26, and the valve chamber C have transverse cross sectional symmetry about the common axis A–A'.

A valve V is normally positioned centrally within the valve chamber C and is streamlined and symmetrical about the axis A,A' so that fluttering of the valve is avoided. As shown the valve V includes an intermediate disc portion 31, cylindrical land portions 32 and 33 extending from opposite ends 34 and 35 respectively of the disc portion 31, and pointed conical ends 36 and 37 on the cylindrical portions 32 and 33 respectively. The cylindrical portions 32 and 33 are of a diameter substantially equal to the diameter of the first inner walls 21,21' respectively and fit snugly therein.

A pair of cylindrical helical springs 38 and 39 are seated in the recesses 27 and 28 respectively. The spring 38 has its one end abutting the annular shoulder 29 and its other end snugly encompassing the cylindrical portion 32 of valve V and abutting the valve disc portion end face 34. The spring 39 likewise has its one end abutting the annular shoulder 29 and its other end snugly encompassing the cylindrical portion 32 of valve V and abutting the valve disc portion end face 35. The springs 38 and 39 are of substantially equal strength and normally bias the valve V to a position intermediate the valve seats 25 and 26. The springs 38 and 39 further provide the sole means for supporting the valve V in coaxial relationship within the valve chamber C.

As shown in this embodiment the disc portion 31 of the valve V is of only slightly greater diameter than the cylindrical portions 32 and 33, being far removed from the axis A,A', and is of a slightly less diameter than the diameter of the inner cylindrical surface 15 encompassing the valve chamber C so that an annular space is provided between the inner cylindrical surface 15 and the peripheral surface of the disc portion 31 which has a transverse cross sectional area substantially equal to the transverse cross sectional area of the valve passages 23 and 24. The space thus provided normally permits smooth and unrestricted flow of fluid around the valve V through the valve chamber C.

The disc portion 31 is provided with tapered annular valve faces 0,41 on opposite circumferential edges thereof to provide snug fit. The valve face 40 is substantially parallel to the valve seat 25 and to the face of the conical end 36 of the valve V. The valve face 41 is substantially parallel to the valve seat 26 and to the face of the conical end 37.

Bypass passages 44 and 45 are provided in the valve body members 11 and 12 respectively. The bypass passage 44 has an opening into the valve chamber C at one end and into the valve passage 23 at the other end and is controlled by a manually actuated, screw threaded bypass control valve 6 threaded into bore 48 within the body member 11. The bypass passage 45 likewise has an opening into the valve chamber C at one end and into the valve passage 24 at the other end and is controlled by a manually actuated, screw threaded bypass valve 47 threaded into bore 49 within the body member 12. As shown the bypass passages 44 and 45 each include two portions arranged substantially at right angles to each other, the portions which communicate with the valve chamber C being parallel to each other and normal to the axis of flow of fluid through the passages 23 and 24 while the portions of the bypass passages 44 and 45 which communicate with the main valve passages 23 and 24 which are oppositely disposed and in axial alignment with each other and parallel to the common axis of the main valve passages 23 and 24. O-Rings 50 and 51 provide fluid seals between the bypass valves 46 and 47 respectively and their bores 48 and 49 respectively. The screw-threaded bypass valves 46 and 47 and the bores 48 and 49 into which they are threaded have parallel axes and the heads of the screw valves 46 and 47 are arranged side by side and in close proximity to each other and are readily accessible from the exterior of the valve body.

The valve V will preferably be made of rubber or of a synthetic rubber-like material which is not susceptible to excessive corrosive action by the fluid being carried through the safety valve. If the fluid being transported is air or other material which can be allowed to seep into the atmosphere without danger the valve V could be made of metal since, it would not then be so important to provide a complete seal between the valve faces 40,41 and the valve seats 25,26.

As previously pointed out the valve member V is symmetrical in form about the axis A,A' and on both sides of a transverse axis passing through the center of the disk portion 31. The angle of inclination of the valve faces 40 and 41 and of the conical ends of the valve V with reference to the longitudinal axis A,A' is shown as approximately 45° but may be a few degrees greater or less. As shown this slope extends from the tips of the conical ends of the valve to the flat top of the disk portion 31 and includes the tapered valve faces 40 and 41, being broken only by the flat cylindrical portions of lands 32 and 33 over which the ends of the springs 38 and 39 are fitted. By reason of this construction not only is a tight seal insured when the valve is seated in either direction, but a streamlined construction is provided in either direction whereby the fluid passing through the valve is caused to divide and flow smoothly and equally around the circumference of the valve member, thus avoiding undesirable valve flutter. Moreover, since the cylindrical shoulders or lands 32 and 33 are of only slightly less diameter than the disk portion 31 the springs alone will be enabled to support the valve without the assistance of any other means more readily than would be the case if the shoulders were located nearer the axis A,A', in which case undesirable wobbling of the valve would be likely to occur unless additional supporting means were provided. The symmetrical shoulders or lands 32 and 33 are preferably substantially more than one-half way from the axis A,A' to the flat ring or disk portion 31 of the valve in the construction shown in FIGS. 1–10.

Figure 3:
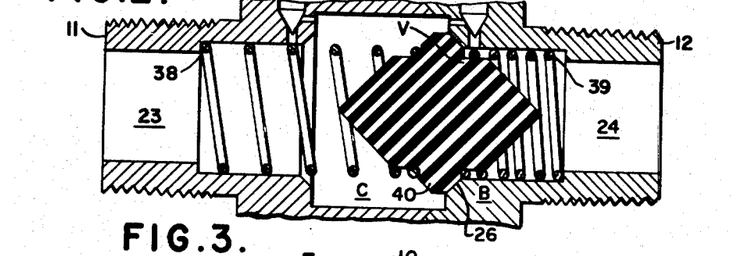
FIG. 3 is a fragmentary axial sectional view of the valve of the invention seated at the outlet end.

FIG. 3 shows the valve member V with the valve face 41 snugly seated against the right hand valve seat 26 completely shutting off the flow of fluid from the valve passage 23 into the valve passage 24. Above atmospheric pressure in the valve conduit 23 will keep the valve V seated in the position shown in FIG. 3 as long as the pressure in passage 24 is atmospheric.

Figure 4:
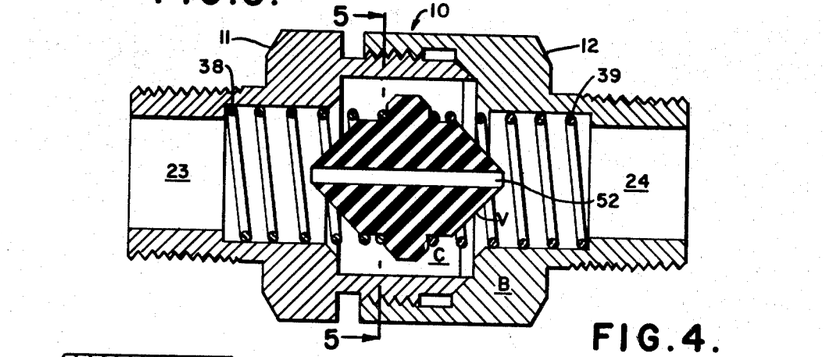
FIG. 4 is an axial sectional view of a modified form of the valve of the invention.
Figure 5:
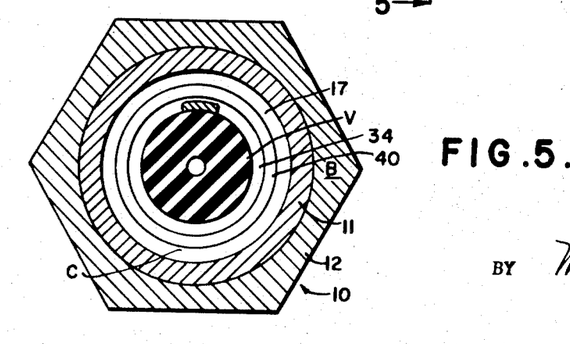
FIG. 5 is a sectional view of the modified valve form taken on line 5—5 of FIG. 4.

FIGS. 4 and 5 illustrate a modified form of the invention which is designed for use in an air line, or other fluid line where the fluid can be permitted to escape into the atmosphere in small amounts. Instead of providing bypass passages in the valve housing as in the embodiment shown in FIGS. 1–3, a central passage 52 is provided along the longitudinal axis of the valve V. The passage 52 is preferably a small diameter, cylindrical bore coaxial with the valve V. The passage 52 will allow leakage of a small amount of fluid through the valve when the valve has been forced against one of its seats as a result of a differential pressure across the valve as would be the case when a break occurs in the flow line downstream from the safety valve.

Figure 2:
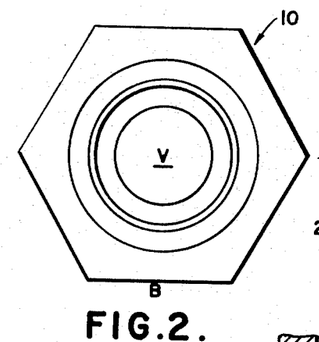
FIG. 2 is a side elevation of the valve of the invention looking from one end.

In operation the safety valve assembly 10 shown in FIGS. 1 to 3, when used to shut off the flow of gas in a gas line in the event of a break is positioned in a gas line between a pressurized gas source and a utility device. Normally the valve member V is positioned midway between the valve seats 25 and 26 but should a break occur in the downstream side of the flow line from the safety valve, a pressure differential will develop across the valve V, which will force the valve V against the downstream valve seat. As shown in FIG. 3 the low pressure occurs in passage 24 and the high pressure occurs in passage 23. The valve V will remain in the position shown until the break in the downstream flow line is fixed and pressure is again built up in the valve passage 24 to equal the pressure in the passage 23.

The bypasses 44 and 45 are provided with manually controlled valves 46 and 47 so that an operator can selectively open one of the normally closed bypass valves 46 or 47 to permit fluid from the valve chamber C to flow around the closed valve V and build up pressure in the low pressure valve passage. Valve 47 would be opened in FIG. 3 to permit fluid to flow into passage 24 until the pressure across valve V is equalized and the valve V is returned to its normal open position by means of the springs 38 and 39. Once the valve V has been returned to its normal open position the operator again closes the bypass valves 46 and 47 so that gas would not escape through the bypass passages into the atmosphere if another break should occur in the flow line.

The valve V shown in FIG. 4 is normally positioned as shown and would be forced to seat against its valve seats located on the downstream side should a break in the downstream flow line occur. The main volume of fluid flow would be shut off by the valve V but a small amount of fluid would still flow through the central passage 52 into the downstream passage. However as long as the break in the downstream flow line remains open no pressure can build up in the downstream valve passage. When the break in the downstream flow line has been repaired, the fluid flowing through the central passage 52 will build up pressure on the downstream side of the valve V until the pressure across the valve V is equallized, at which time the valve V will be returned to its normally open position by the springs 38 and 39.

The stream lined valve V supported solely by the springs 38 and 39 is substantially flutter free because of its symmetrical slope with respect to its axis and because of its position on the common axis of the valve chamber C. The surface area of the valve V facing the path of fluid flow is uniformly distributed about the valve axis A–A' so that the axial pressure of fluid on the valve is also uniformly distributed with respect to the valve axis. There are therefore no unequal forces tending to cant the valve V relative to its axis, and the valve will move axially into sealing engagement with one of its seats 25 or 26 when a differential pressure occurs across the valve.

The valve assembly 10 can be made more cheaply than valves of a similar type requiring guide stems and guide bearings.

Because my valve is substantially flutter free and will be caused to seat properly as a result of a differential fluid pressure across it, the operation of my improved safety valve is fully as satisfactory as valves provided with guide stems and guide bearings and even more so because frictional contact between valve stems and guide bearings are eliminated.

The parallel conical faces 36 and 37 of my valve V and the valve faces 40 and 41 on the same side of the valve are features of my valve which help to eliminate turbulence within the valve chamber and help to cause uniform distribution of fluid flow around the circumference of the valve.

Figure 6:
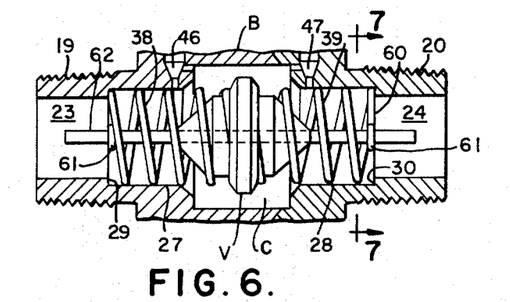
FIG. 6 is an axial sectional view showing another modified embodiment of the invention.
Figure 7:
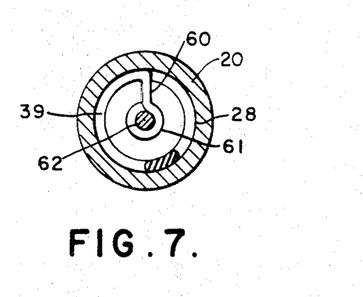
FIG. 7 is a cross-sectional view, taken substantially in the plane of the line 7—7 in FIG. 6.

Reference is now drawn to another modified embodiment of the valve shown in FIGS. 6 and 7. For most part this embodiment is the same as that in FIGS. 1–3, so corresponding reference numerals are used to identify the corresponding parts. However, this embodiment is characterized in that additional means are provided to assist the springs 38, 39 in supporting the valve member V in the chamber C. These means involve providing the outer ends of the springs 38, 39, that is, the ends thereof which project into the valve port recesses 27, 28, with integral extensions 60, the latter being directed radially inwardly and terminating in eyes or bearings 61 located on the longitudinal axis of the valve, as is best shown in FIG. 7. The eyes 61 provide bearings which slidably receive the end portions of a rod 62 which extends axially through and is secured in the valve member V. Thus, the bearings 61 coacting with the slidable rod 62, effectively guide the movement of the valve member toward and away from the valve seats and assist the springs 38, 39 in properly supporting the valve member in the chamber C. When the valve is closed, fluid may be by-passed through the by-pass means 46, 47, as in the embodiment of FIGS. 1–3.

Figure 8:
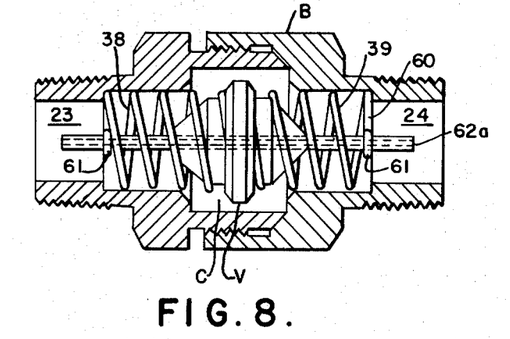
FIG. 8 is an axial sectional view of another modified embodiment.
Figure 9:
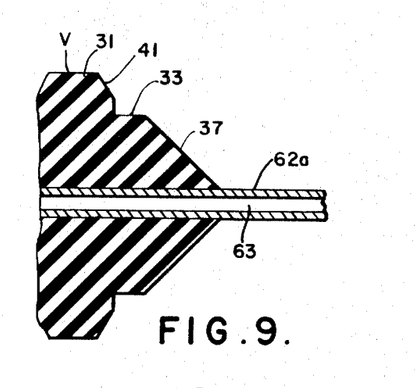
FIG. 9 is an enlarged, fragmentary sectional detail of a valve member equipped with a hollow supporting rod.
Figure 10:
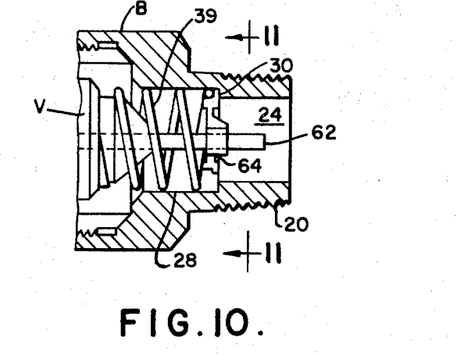
FIG. 10 is a fragmentary axial sectional view showing another modification.
Figure 11:
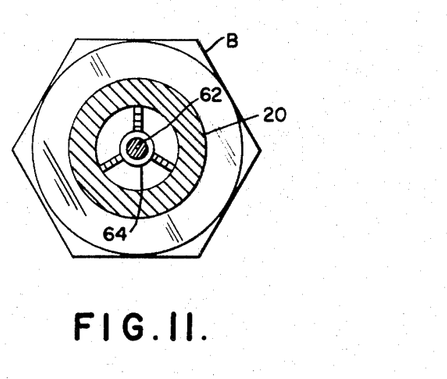
FIG. 11 is a cross-sectional view, taken substantially in the plane of the line 11—11 in FIG. 10.

The modified embodiment of FIGS. 8 and 9 also provides the additional supporting means for the valve member as in FIGS. 6 and 7, but in the environment of the valve of FIGS. 4 and 5 where the fluid by-pass is made through the center of the valve member itself. Thus, in the embodiment of FIGS. 8 and 9, the valve member supporting rod 62a is hollow so as to provide an open-ended axial passage 63 therethrough, as shown in FIG. 9. This passage establishes communication between the valve ports 23, 24 when the valve member is in either of its closed positions.

In another modified embodiment shown in FIGS. 10–13, the valve member V is also provided with a supporting rod which may be either the solid rod 62 or the hollow rod 62a, depending upon whether the fluid by-pass is made through the valve body as in FIG. 6 or through the valve member as in FIG. 8. In either event, in the embodiment of FIGS. 10–13 the end portions of the rod 62 (or 62a) are slidably journalled in a pair of spiders 64 which are seated in the valve port recesses 27,28 in abutment with the shoulders 29, 30.

Figure 12:
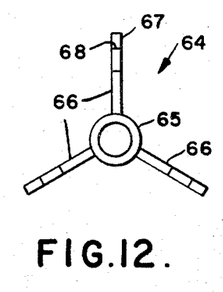
FIG. 12 is an elevational view on an enlarged scale of one of the spiders used in the embodiment of FIGS. 10 and 11.
Figure 13:
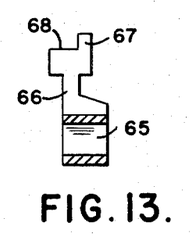
FIG. 13 is a fragmentary sectional detail of the spider.

As is best shown in FIGS. 12 and 13, each of the spiders 64 comprises a central, tubular bearing portion 65 and a set of radially outwardly extending arms 66. The bearing portion 65 slidably accommodates the valve member rod 62 (or 62a), while the outer end portions 67 of the arms 66 are in abutment with the valve port shoulders 29,30. These end portions of the arms are provided with notches 68 for seating the ends of the springs 38,39 it being understood that in this embodiment the ends of the springs are not equipped with the bearing forming extensions 60,61, as in the embodiments of FIGS. 6–8.

Figure 14:
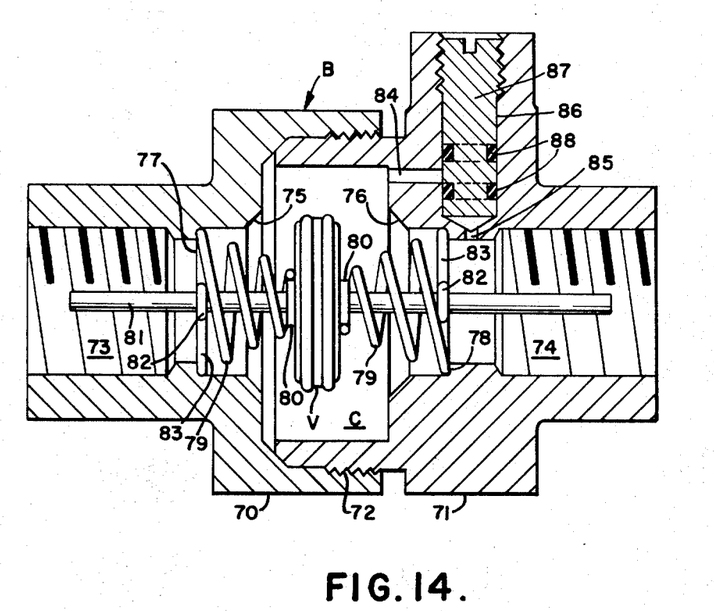
FIG. 14 is an axial sectional view of still another modified embodiment of the valve.
Figure 15:
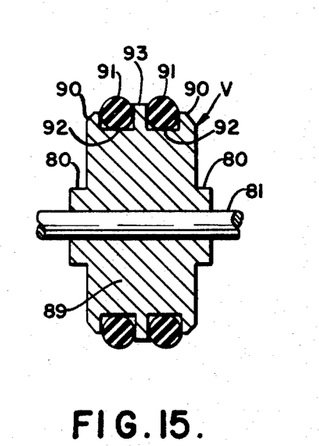
FIG. 15 is a fragmentary enlarged sectional view of the valve member used in the embodiment of FIG. 14.

FIGS. 14 and 15 illustrate another modified embodiment of the valve of the invention, wherein the valve body B consists of a pair of complemental sections 70,71 which are screw-threadedly connected together as at 72. The valve body defines a valve chamber C with coaxial valve ports 73,74 having valve seats 75,76 facing the valve chamber. The valve ports are equipped with annular shoulders 77,78 for abutment by outer ends of tapered, helical springs 79 located at the opposite sides of the valve member V, the valve member being equipped at its opposite sides with circular lands 80 on which the inner ends of the springs are seated.

To assist the springs 79 in supporting the valve member V in the chamber C, the valve member is provided with an axial rod 81, the end portions of which are slidable in bearings 82 provided on extensions 83 of the outer ends of the springs 79, as already described in connection with FIGS. 6–9.

The valve member supporting rod 81 is solid, and when the valve member engages the valve port seat 76, fluid may be by-passed from the chamber C to the valve port 74 through by-pass ducts 84,85 which are formed in the body section 71 in communication with a bore 86 with which the section 71 is also provided. As will be noted, the duct 84 opens into the chamber C, while the duct 85 opens into the valve port 74. A by-pass valve plug 87, equipped with suitable sealing rings 88, is screw-threaded into the bore 86, so as to control the flow of fluid through the by-pass ducts.

The arrangement is particularly well suited for use in an explosion valve, in which the valve member V comprises a disc-like body 89 provided at its opposite sides with the aforementioned spring seating lands 80. For sealingly engaging the valve seats 75,76, the valve member body 89 is also provided with chamfered peripheral edges 90 and with a pair of sealing rings 91 of Neoprene, or the like. The rings 91 are seated in annular grooves 92 formed in the periphery of the body 89, the grooves being separated by an intermediate land portion 93.

Figure 16:
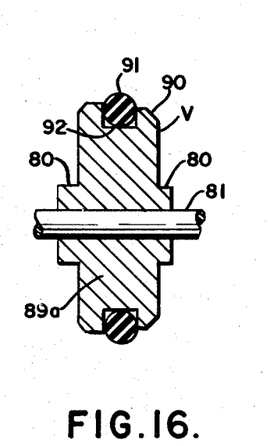
FIG. 16 is a fragmentary enlarged sectional view of a modified valve member.

If the valve is a gas valve, a modified valve member shown in FIG. 16 may be used. The body 89a of this valve member is provided with only one chamfered edge 90 and only one sealing ring 91 for coaction only with the valve seat 76 on the downstreamside of the valve. Otherwise the arrangement is the same as already explained in connection with FIG. 14.

Figure 17:
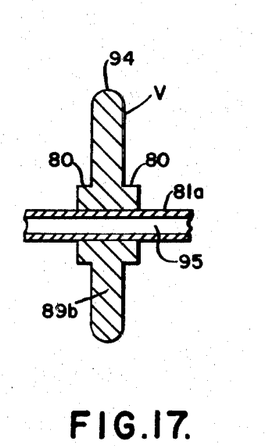
FIG. 17 is a fragmentary enlarged sectional view of another modified valve member.

Finally, if the valve is used only for transmission of air, the valve member of FIG. 17 may be utilized, this being simply in the form of a disc body 89b having a rounded periphery 94 for engaging either of the seats 75, 76. In such event the sealing rings 91 are omitted and the fluid by-pass 84–88 through the body section 71 also need not be provided, since the valve member supporting rod 81a may be hollow to provide a fluid by-pass 95 therethrough, as already mentioned in connection with FIGS. 8 and 9.

Although the embodiment of FIG. 14, using a valve member in accordance with FIGS. 15, 16 or 17, has been shown as having the valve member rod 81 (or 81a) slidably journalled in the bearings 82 carried by extensions 83 of the springs, 79, it is to be understood that, alternatively, the rod of the valve member may be journalled in spiders seated in the valve ports 73,74 against the shoulders 77,78, as in the embodiment of FIGS. 10–13.

Figure 18:
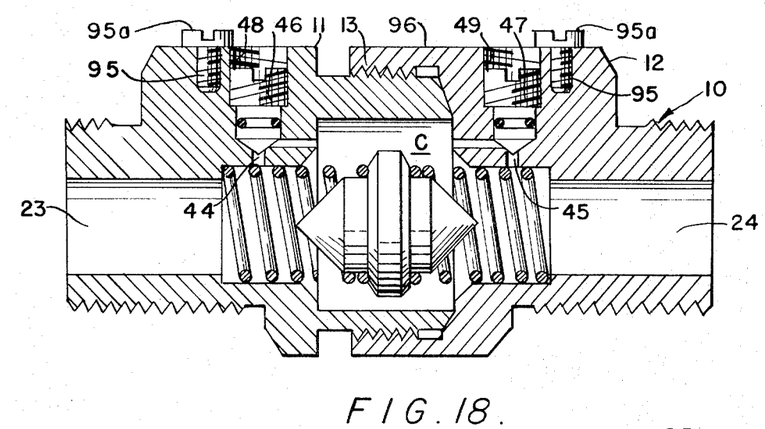
FIG. 18 is a sectional view of the valve shown in FIG. 1 but equipped with keeper screws at the by-pass valves thereof.

Particular reference is now drawn to FIG. 18 which shows the valve 10 of FIG. 1 equipped as already described with the by-passes 44, 45 and manually controlled by-pass valves 46, 47 therein, these by-pass valves being in the form of screws threaded into the bores 48, 49 in the body of the valve. Manifestly, when either of the by-pass passages 44 or 45 is to be closed, as it is during normal operation of the valve 10, the by-pass valve screw 46 or 47 is screwed-in its bore 48 or 49. Conversely, when the by-pass passage is to be opened, the by-pass valve screw is screwed-out in its bore.

It is to be particularly noted that the safety valve of the invention is mainly intended to be used with fluids which, because of their chemical and/or economic characteristics, and also because of considerably pressures under which they are transmitted, make it desirably to minimize possible leaks. The valve of the invention serves this purpose quite well in closing off fluid transmission through the valve in the event of a pressure differential across the valve, as for example, that which may be caused by substantial leakage at some point downstream from the valve. When such leakage is corrected, the valve, for example the valve 10 of FIGS. 1 or 18, has to be reset to its normally open position, and this is done by opening the by-pass valve screw, for example the screw 47, which permits restricted flow of fluid through the by-pass passage, for example the passage 45, so that the fluid pressure across the valve is substantially balanced and the movable member of the valve returns to its centralized position.

Of course, the opening of the by-pass valve screw, for example the screw 47, is done manually by screwing-out the same in its bore 49, and if this were done in an arbitrary manner, it is quite possible that the by-pass valve screw would be screwed completely out of its bore with the result that dangerous fluid under high pressure would be discharged from the valve through the by-pass passage (44 or 45) and through the bore (48 or 49), thus creating a hazardous condition which the valve itself is intended to eliminate.

Figure 19:
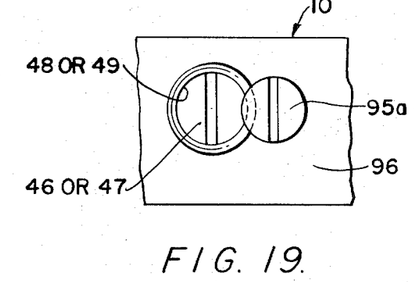
FIG. 19 is a fragmentary plan view of one of the by-pass valves and keeper screws shown in FIG. 18.
Figure 20:
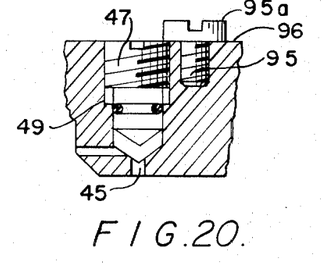
FIG. 20 is a fragmentary sectional view showing one of the by-pass valves of FIG. 18 in its open position.

Thus, to safeguard against this possibility, the invention also provides means for positively preventing the by-pass valve screws 46 and 47 from being inadvertently or accidentally removed from their respective bores 48 and 49. Such means comprise a keeper screw 95 which, as shown in FIGS. 18, 19 and 20, is threaded into the valve body at a point adjacent the bore 49. The screw 95 has an enlarged head 95a which is sufficiently large in diameter as to overlap the bore 49 to some extent, yet leaves the bore sufficiently open to permit a screw-driver to be inserted into the bore for turning the by-pass valve screw 47.

When the keeper screw 95 is in position, the underside of its head 95a engages the outer surface 96 of the valve body and the length of the bore 49 in relation to the by-pass valve screw 47 is such as to permit adjustment of the screw 47 between its screwed-in position in which it closes the by-pass passage 45 and its screwed-out position in which the passage 45 is open, while the screw 47 remains fully within the bore 49. In its screwed-out position, the screw 47 comes up against the underside of the keeper screw head 95a, the latter thus acting as stop means to prevent inadvertent removal of the screw 47 from the bore 49 and thereby safeguard against possible discharge of pressurized fluid through the open passage 45 and bore 49. In FIG. 18 the by-pass valve screw 47 is shown in its screwed-in or closed position, while FIG. 20 shows the same in its screwed-out or open position against the underside of the keeper screw head 95a. A second keeper screw 95, with its head 95a, is provided in the valve body to prevent removal of the by-pass valve screw 46 from the bore 48 in the same manner as already described.

Figure 21:
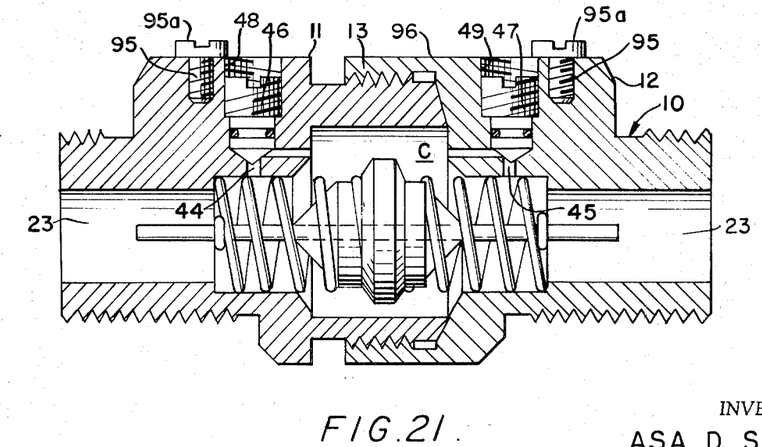
FIG. 21 is a sectional view of the valve shown in FIG. 6 but equipped with keeper screws at the by-pass valves thereof.

FIG. 21 illustrates the keeper screws 95 applied to the by-pass valve screws 46, 47 of the safety valve of FIG. 6, the arrangement and function of the keeper screws being the same as already explained in connection with the valve in FIGS. 18–20.

Figure 22:
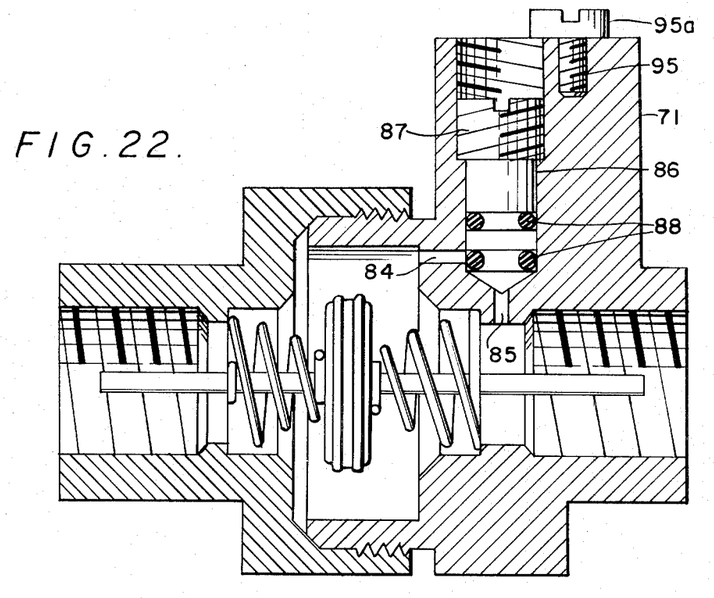
FIG. 22 is a sectional view of the valve shown in FIG. 14 but equipped with a keeper screw at the by-pass valve thereof.
Figures 23, 24, 25:
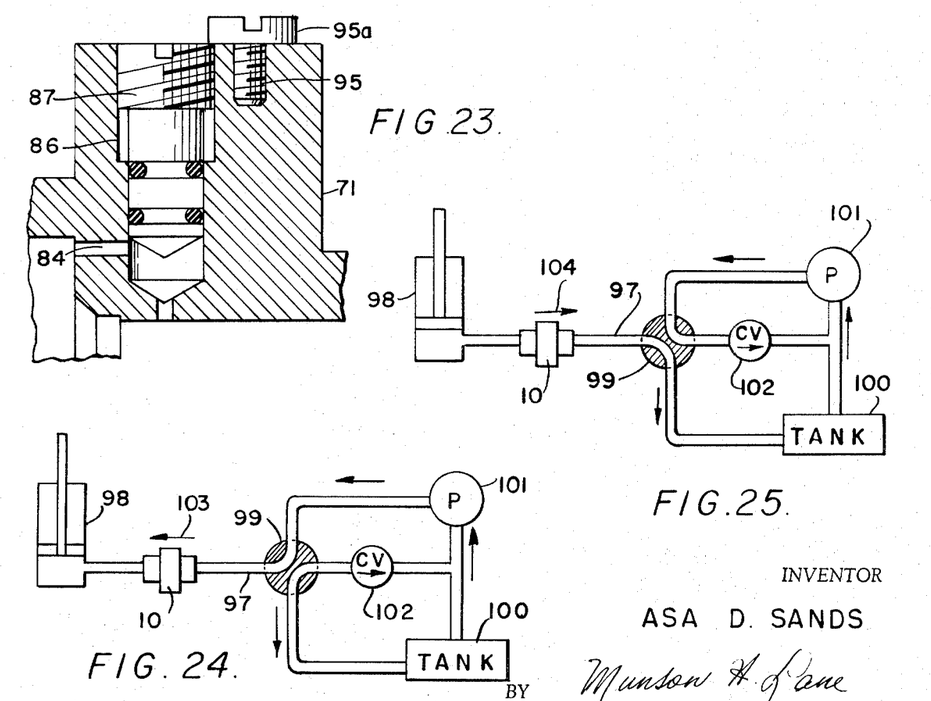
FIG. 23 is a fragmentary sectional view showing the by-pass valve of FIG. 22 in its open position.
FIG. 24 is a schematic view exemplifying a hydraulic system with the valve of the invention embodied therein, the fluid flow being in one direction through the valve.
FIG. 25 is a view similar to that in FIG. 24 but showing conditions under which the fluid flow through the valve is in the opposite direction.

Similarly, FIGS. 22 and 23 show the keeper screw 95 on the body member 71 of the safety valve of FIG. 14, the enlarged head 95a of the keeper screw overlapping the bore 86 which contains the by-pass valve screw 87. The closed or screwed-in position of the screw 87 is shown in FIG. 22 wherein it blocks the by-pass passages 84, 85, while in FIG. 23 the passages 84, 85 are open when the screw 87 is screwed-out in the bore 86 against the underside of the keeper screw head 95a. In the instance of the valve of FIGS. 14 and 22–23 only one by-pass valve screw 87 is provided at the downstream or outlet side of the valve, and thus only one keeper screw 95 is necessary.

Each of the safety valves in FIGS. 1, 6, 18 and 21 is arranged so that its valve member V is axially movable in either direction to close off a valve port at one side or the other of the valve chamber C. When the valve is installed in a line in which fluid flows in only one direction, the valve closes only in that direction, that is, in the downstream direction, as for example when a leak occurs downstream from the valve and a pressure differential is created, under which the valve closes by higher pressure from the upstream side. In this type of an installation it is necessary to provide a valve port for the valve member V only at the downstream side of the chamber C, along with the associated by-pass means at that port. However, by providing valve ports and by-pass means at both sides of the chamber C, (as in the instance of the valves in FIGS. 1, 6, 18 and 21) an added benefit is obtained in that the valve may be installed in the fluid line in either direction, with assurance that one of the valve ports and by-pass means available at the downstream side of the valve where the valve closing action occurs.

However, the provision of the valve with valve ports and by-pass means at both sides of the chamber C is even more important and virtually necessary in installations where fluid flows through the valve selectively in either direction, one such situation being exemplified in the closed hydraulic system shown diagrammatically in FIGS. 24 and 25.

Here, for example, the safety valve 10 is installed in a hydraulic line 97 between a hydraulic cylinder 98 and a four-way control valve 99, the system also including a fluid tank 100, a pump 101 and a check valve 102, all arranged in the conventional well known manner. When the control valve 99 is in the position shown in FIG. 24, fluid flows from the pump 101 through the safety valve 10 in the direction of the arrow 103, thus supplying fluid to the cylinder 98 to extend the same. On the other hand, when the control valve 99 is in the position shown in FIG. 25, the cylinder 98 is retracted and fluid flows through the safety valve 10 in the direction of the arrow 104 to drain in the tank 100.

Thus, since the fluid flow through the safety valve 10 is selectively in opposite directions, either of the two valve ports at the opposite sides of the valve chamber C can serve as the inlet port while the other serves as the outlet, depending on the direction of flow, and either of the two valve ports can become closed by a differential in fluid pressure, depending upon which valve port is on the outlet or downstream side, where a leak may have occurred. Obviously, the arrangement also necessitates the provision of by-pass means at the ports on both sides of the safety valve, so that the valve may be restored to its normal open position when the leak has been corrected.

It will be appreciated from the foregoing that the valve of the invention as represented by FIGS. 1, 6, 18 and 21 has what may be called double-acting characteristics resulting from the movability of the valve member V in either axial direction to close off the port at either side of the valve chamber C, in accordance with the direction of fluid flow, and further resulting from the provision of by-pass means for the valve ports at both sides of the valve chamber, to facilitate resetting of the valve member by balancing of pressure when conditions which caused closing of the valve have been corrected. As such, the provision of the two valve ports and of the two associated by-pass means at the opposite sides of the valve chamber is useful not only in permitting the safety valve to be installed reversibly in a line having uni-directional fluid flow, but what is more important is its usefulness in lines where fluid flows selectively in both direction, as already explained in connection with FIGS. 24, 25.

It may be noted that the safety valves of FIGS. 4 and 8 are also double-acting in the sense that their valve member is movable in either axial direction to close off a port at either side of the valve chamber, but in this instance by-pass means through the valve body are not necessary inasmuch as a by-pass is provided through the valve member itself.

The invention is particularly applicable to lines carrying oxygen and dangerous gases generally such as are used in connection with cutting torches and the like wherein back pressure are likely to be generated. The present invention will tend to prevent person injury, explosion and dangerous fires.

Further advantages of the double bypass system herein described will be apparent from the following comment which is directed to those skilled in the gas welding art. As is known to those skilled in this art all acetylene gas fittings are made with a left hand thread for connections of hoses used in burning torches. The fitting when made has a machined circle around its body signifying it is an acetylene fitting with a left hand thread.

Oxygen is used with acetylene when using a burning torch for cutting metal. The fitting for oxygen has a right hand thread, hoses generally are a twin hose, one for acetylene and one for oxygen each the same size, pressures in the hose are regulated by the user with regulator gauge at the supply.

One valve is needed for safety on the acetylene line and one valve is needed for safety on the oxygen line.

The bypass valve is made with a left hand thread for acetylene on one end of the valve with a bypass, and on the other end of the valve has a right hand thread for oxygen with a bypass. Thus a double bypass valve can be used for either acetylene or oxygen.

What is claimed is:

1. In a safety valve, the combination of a valve body defining a valve chamber having a fluid inlet and also having a fluid outlet port, a main valve member movable in said chamber and resiliently biased to a position wherein said outlet port is normally open, said main valve member being movable into engagement with the outlet port to close off the same from said chamber when a substantial fluid pressure differential across the valve exists, said main valve body also being provided with a restricted by-pass passage extending from said chamber into said outlet port, a by-pass valve provided in said body and normally closing said by-pass passage, said by-pass valve being manually openable to effect a substantial balance of fluid pressure across the valve and return said valve member to its position in which said outlet port is open, and means for preventing removal of said by-pass valve from said body when the by-pass valve is opened, said valve body having an outer surface and being formed with a bore extending inwardly from said outer surface to an intersection with said by-pass passage, said bore having a screw-threaded outer end portion, said by-pass valve comprising a screw adjustably engaging the threaded outer end portion of said bore, said screw being adjustable between a screwed-in position wherein it closes said by-pass passage and a screwed-out position wherein the by-pass passage is open, said removal preventing means being effective to prevent screwing-out of said screw from said bore, and said removal preventing means comprising a keeper screw threaded into said valve body at a point adjacent said bore, said keeper screw having an enlarged head the underside of which overlaps said bore and prevents screwing-out of said by-pass valve screw from the bore.

2. The valve as defined in claim 1 which is further characterized in that the underside of said keeper screw engages said outer surface of the valve body, the length of said bore in relation to said by-pass valve screw being such as to permit adjustment of the valve screw between its screwed-in and screwed-out positions within the limit of the bore as defined at the outer end of the bore by the overlapping head of said keeper screw.

* * * * *